(12) United States Patent
Lang

(10) Patent No.: US 6,369,702 B1
(45) Date of Patent: *Apr. 9, 2002

(54) REARVIEW MIRROR WITH SAFETY CATCH

(75) Inventor: Heinrich Lang, Ergersheim (DE)

(73) Assignee: Lang-Mekra North America, LLC, Ridgeway, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,971

(22) Filed: Apr. 30, 1999

(30) Foreign Application Priority Data

Feb. 5, 1999 (DE) .......................... 199 04 777

(51) Int. Cl.$^7$ ................................ B60Q 1/00
(52) U.S. Cl. .................. 340/436; 340/540; 340/903; 340/943; 248/549; 359/841; 359/875
(58) Field of Search ................. 340/436, 943, 340/903, 540; 248/549; 359/841, 875

(56) References Cited

U.S. PATENT DOCUMENTS

| | | | |
|---|---|---|---|
| 3,107,077 A | 10/1963 | Lassa | |
| 3,339,876 A | 9/1967 | Kampa | |
| 3,346,229 A | 10/1967 | Carson, Jr. | |
| 3,384,334 A | 5/1968 | Malachowski | |
| 3,599,926 A | * 8/1971 | Takahashi | 248/549 |
| 3,662,328 A | 5/1972 | Brudy | |
| 4,012,022 A | 3/1977 | Tomita | |
| 4,077,597 A | 3/1978 | Greig | |
| 4,125,244 A | 11/1978 | Lukey | |
| 4,186,905 A | 2/1980 | Brudy | |
| 4,210,357 A | 7/1980 | Adachi | |
| 4,254,931 A | * 3/1981 | Ikens et al. | 248/549 |
| 4,422,724 A | * 12/1983 | Otsuka et al. | 359/875 |
| 4,592,529 A | 6/1986 | Suzuki | |
| 4,692,000 A | 9/1987 | Wada et al. | |
| 4,778,265 A | 10/1988 | Suzuki | |
| 4,789,232 A | 12/1988 | Fingerle et al. | |
| 4,798,967 A | 1/1989 | Yamana et al. | |
| 4,877,319 A | 10/1989 | Mittelhäuser et al. | |
| 4,896,859 A | 1/1990 | Polzer et al. | |
| 4,951,912 A | 8/1990 | Manzoni | |
| 4,957,359 A | 9/1990 | Kruse et al. | |
| 5,005,797 A | 4/1991 | Maekawa et al. | |
| 5,081,546 A | 1/1992 | Bottrill | |
| 5,137,247 A | 8/1992 | Lang et al. | |
| 5,210,652 A | 5/1993 | Perkinson | |
| 5,212,467 A | 5/1993 | Park | |
| 5,306,953 A | 4/1994 | Weiner | |
| 5,325,096 A | 6/1994 | Pakett | |
| 5,337,190 A | 8/1994 | Kogita et al. | |

(List continued on next page.)

FOREIGN PATENT DOCUMENTS

| | | |
|---|---|---|
| EP | 0591743 A1 | 4/1994 |
| EP | 0370965 A2 | 5/2000 |
| WO | 9525322 | 9/1995 |

OTHER PUBLICATIONS

U.S. Patent Application No. 09/115,198 filed Jul. 15, 1998.

*Primary Examiner*—Daniel J. Wu
(74) *Attorney, Agent, or Firm*—Dority & Manning, P.A.

(57) ABSTRACT

A rearview mirror for motor vehicles includes a mirror housing, a mirror pane mounted in the housing, a support structure for attaching the mirror housing to the vehicle, and a pivoting connection disposed between the mirror housing and the support structure. The pivoting connection includes at least one safety catch which retains the mirror housing in an operating position relative to the support structure. The safety catch is releasable upon the approach of the mirror housing to an obstruction to thereby allow the mirror housing to pivot relative to the support structure.

14 Claims, 1 Drawing Sheet

U.S. PATENT DOCUMENTS

| | | |
|---|---|---|
| 5,339,075 A | 8/1994 | Abst et al. |
| 5,369,530 A | 11/1994 | Yamauchi et al. |
| 5,432,640 A * | 7/1995 | Gilber et al. ............... 359/841 |
| 5,583,495 A | 12/1996 | Ben Lulu |
| 5,604,644 A | 2/1997 | Lang et al. |
| 5,615,054 A | 3/1997 | Lang et al. |
| 5,621,577 A | 4/1997 | Lang et al. |
| 5,687,035 A | 11/1997 | Lang |
| 5,726,816 A | 3/1998 | Gordon |
| 5,781,354 A | 7/1998 | Sakata |
| 5,786,772 A | 7/1998 | Schofield et al. |
| 5,844,733 A | 12/1998 | Ravanini |
| 5,880,895 A | 3/1999 | Lang et al. |
| 5,959,790 A * | 9/1999 | Hempelmann ............... 359/841 |
| 5,963,127 A | 10/1999 | Lang et al. |

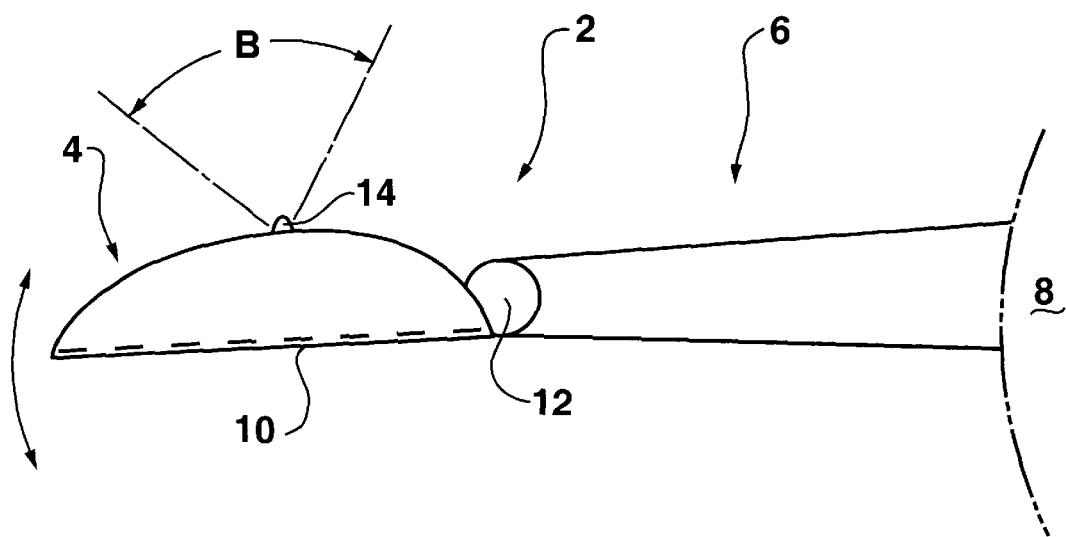

REARVIEW MIRROR WITH SAFETY CATCH

FIELD OF INVENTION

The invention concerns a rearview mirror, in particular, an outside rearview mirror for motor vehicles having a pivot connection with a safety catch.

BACKGROUND OF THE INVENTION

It is common knowledge to place a pivoting connection between a mirror housing which contains a mirror pane and a support structure which supports the mirror housing on a part of a body of a vehicle, wherein, this pivoting connection possesses at least one safety catch allowing the mirror housing to releasably fix itself in an operational position. Should sufficient force be brought against the mirror housing, then the safety catch of the support structure would be overcome or disengaged. When this happens, the mirror housing is movable out of its operational position, in which it is essentially held outwardly and away from the vehicle body, and into a folded position, in which the mirror housing becomes approximately parallel to the vehicle body. In this position the mirror housing gains a lesser outward exposure than when it was swung away from the vehicle body.

The safety catch of the mirror housing in relation to the support structure can be accomplished by a spring loaded sphere, which is seated in an appropriate recess. During normal operation, that is, with the mirror housing snapped into its operating position, the safety catch must be sufficiently resistant, to withstand the impacts and forces which are common in normal operation. Such forces include, for instance, wind forces, which can be very substantial in the case of larger mirror housings and high speed driving. Further, the safety catch between the mirror housing and the support structure must be vibration free, in order to be able to assure a non-impeded view from the rearview mirror.

Demands of the service call for a safety catch device or detent system with relatively high holding power. This is because the mirror housing is not to be moved out of its operative position into the folded position for trivial reasons, and for such movement, a substantial force is needed.

The relatively high forces are not critical, when they are brought against the mirror, when, for instance, with very slow moving speeds (truck positioning, parking, etc.) should the mirror housing strike a rigid obstruction with substantial force, then the mirror housing is slowly moved out of its safety catch. Damages to the mirror housing and/or the mirror pane and/or the safety catch apparatus are excluded by the described means.

The situation is reversed, however, when sudden striking or impact forces act upon the mirror housing. In this case, the forces need not be so great, that they move the mirror housing out of its safety catch position, but, because of the application of forces, the mirror housing and especially the therein inset mirror pane can suffer damages.

OBJECTIVES AND SUMMARY OF THE INVENTION

Contrary to these experiences, the present invention has the purpose of so creating a pivotable rearview mirror with a safety catch, that damages to the mirror housing and/or mirror pane and/or the support structure can be assuredly avoided.

To achieve this purpose, the present invention proposes, that the safety catch between the mirror housing and the support structure be releasable upon the approach of the mirror housing to an obstruction.

Regardless as to how fast the vehicle is moving or how strong the striking or impact forces are, in the case of a collision of the mirror housing with an obstruction, the mirror housing can be moved out of its detent operational position with almost no force being exerted, since, at the critical time, i.e. upon the approach of the mirror housing to the obstruction, the safety catch between mirror housing and the support structure releases.

For the moving of the mirror housing from its operational position, into the folded situation, it is no longer requisite, that the detent force of the safety catch be overcome, so that the mirror housing is moved in a resistance free manner into its folded up position.

Other advantageous developments of the invention also are provided.

Advantageously, a sensor is present, which recognizes the approach of the mirror housing to the obstruction. By the use of a sensor, the object of the present invention can be realized in a multitude of forms, as will be shown in the following description.

Furthermore, the sensor is preferably placed in the mirror housing and reacts within a fan shaped space before and to the side of the vehicle. Through the placement of the sensor(s) in the mirror housing, a direct connection is given between a possibly detected obstruction and the mirror housing, so that complex computations are dispensed with, which, for instance would have been necessary if the sensor was located in the forward bumper, etc. There can be more than one sensor placed in the mirror housing to bring about a panoramic detection area, so that even obstructions advancing on the mirror housing from the rear (for instance, upon backing up) can be picked up.

A multiplicity of kinds of sensors are possible. For instance, among these are ultrasonic, infrared, or radar. In each case, the sensor should possess the ability of functioning in darkness, in poor visibility conditions (rain, fog etc,.) or under other unfavorable conditions and be able to detect the approach of an obstruction.

The sensitivity and/or the distance of reactivity of the sensor can be adjustable, in accord with a further preferred embodiment.

The safety catch between the mirror housing and the support structure can, again, be provided in a plurality of embodiments. For instance, the safety catch can be held by electro-magnetic means, whereby, upon the approach of an object, the magnet can be shut off by a circuit breaker, so that the mirror housing is then essentially force free swingable against the vehicle body.

In accord with another embodiment, the safety catch can be actuated by a permanent magnet which, upon the approach of said object, is masked by the application of an opposite magnetic field, preferably engendered electro-magnetically, thus releasing the said safety catch as above.

Finally, the safety catch can be held with simple mechanical means, and, upon approach by an obstruction accordingly unlocked, a procedure which again is preferably done by electro-magnetic means.

It is desirable to avoid possible collisions of the mirror housing with the obstructing object, which could be damaging to the mirror housing and/or the mirror pane and/or the support structure. Such damage could occur even though the safety catch is released and, the mirror housing could move essentially force-free in relation to the support structure.

In accord with another embodiment, following the release of the safety catch, the mirror housing can be moved into its folded position by spring power. For this action, the presence of a tensioned spring or a torsion spring in the area of the pivot axis between the mirror housing and the support structure is necessary. A spring of this kind, when the mirror housing is in its outwardly extended position, i.e. in its operational position, sets the said mirror housing under tension in this operating position and upon the release of the safety catch, the spring works in such a manner, that the mirror housing pivots into its folded position.

Instead of the spring power, the mirror housing can also be moved by means of a motor into its folded position. The advantage in this case is that after the obstruction has been passed by, the mirror housing, by means of the same motor, which then runs in reverse, can be moved back into its operating position, that is, its outwardly extended position.

The releasing of the safety catch between the mirror housing and the support structure can further be made with current cut-off. This is advantageous, if the vehicle must be maneuvered in close quarters to building wall or the like.

In this case the close proximity to what would normally be obstructions would cause the sensor(s) to react, so that the mirror would be moved out of the extended operational position into the folded position, in case the spring loading or the motor drive between the mirror housing and the support structure came into use. Since by close loading/unloading maneuvering, especially when backing, the driver of a vehicle relies upon the outside rearview mirror. Accordingly, exactly then, if an automatic folding retraction occurs of the mirror, the situation is very unwelcome. On these grounds, the driver can preferentially cut out this automatic-retraction into the fold-up position, when he knowingly must approach or drive by close to what would otherwise be obstructing objects.

BRIEF DESCRIPTION OF THE INVENTION

Further details, aspects and advantages of the present invention arise from the following description of an embodiment, with the help of the drawing.

The FIGURE, schematically shows in a greatly simplified manner, a top plan view of a rearview mirror in accord with the invention.

DETAILED DESCRIPTION OF THE INVENTION

A rear view mirror, shown in the drawing with the general reference number 2, encompasses essentially, a mirror housing 4 and a support structure 6, with which the mirror housing 4 is connected to a body part 8 of a motor vehicle. In the mirror housing 4 is placed in a conventional manner a mirror pane 10.

Between the support structure 6 and the mirror housing 4, is found a pivot connection 12, which makes possible a swinging motion of the mirror housing 4 relative to the support structure 6, the extent of which motion is about 90° in both clockwise (CW) and counter clockwise (CCW) directions. This is indicated in the drawing by the bidirectional arrow.

The pivoting connection 12 exhibits a safety catch, which, in normal operation can resist forces active upon the mirror housing 4, that is, especially forces due to the wind when the vehicle is underway without allowing a pivoting of the mirror housing 4.

Furthermore, the safety catch in the pivoting connection is at least low in vibration. As to vibration, the safety catch is as free as possible from active vibratory motion from the body part 8 through the support structure 6 and on to the pivot connection 12. The vibratory motion of the pivot connection 12 is not transmitted to the mirror housing 4. That is to say, the safety catch mechanism does not vibrate.

The safety catch in the pivot connection 12 is, by the object of the invention, always releasable when the mirror housing 4 finds itself approaching an obstruction. In consideration of this point, at least a sensor 14 is provided, which, preferably, is mounted in the mirror housing 4 and monitors in the direction of travel forward and to each side, whereby the detection area (or the "seeing" area) 13 is fan shaped, as made clear in the drawing. The sensor 14 can, for instance, function by ultrasonic, infrared, or radar principles. There can also be more than one sensor placed in the mirror housing 4, in order to monitor the entire area around the mirror housing 4. If this is so arranged, then even obstructions approaching the mirror housing 4 from behind (i.e., by backing up) can be detected.

If the sensor 14 detects that the mirror housing 4 is approaching an obstacle then the safety catch in the pivot connection 12 is disconnected or released. If, for example, the safety catch operates on an electro-magnetic basis, then upon the approach of the mirror housing 4 to an obstacle, by means of activating the current cutoff, the electromagnet safety catch is released. In another embodiment, the safety catch can be magnetic, that is, held in by permanent magnet (s). Upon approach of the mirror housing 4 to an obstruction, this permanent magnet type safety catch is released, by the application of an opposite magnetic field, preferably engendered by an electromagnetic means. If the safety catch is activated by a purely mechanical means, then this safety catch is automatically unlocked, preferentially electromagnetically, as the mirror housing 4 approaches an obstacle.

In each case, the safety catch in the pivot connection 12, as the mirror housing 4 approaches an obstacle, is either released or unlocked, so that the mirror housing 4, upon impact with the obstacle can be moved essentially force free about the pivot connection 12. This pivoting movement is from an operational, extended position, as shown in the drawing, into a folded position, in which movement the mirror housing 4 is rotated CW or CCW to 90° about the pivot connection 12.

It would be preferential, in case an obstruction approaching the mirror housing 4, if not only the safety catch 12 releases, but also that the mirror housing 4 moves itself automatically into a folded position. To this end, between the mirror housing 4 and the support structure 6, a spring is inserted, which is in the outwardly extended (operational) position of the mirror housing 4, as the drawing shows, under tension and when the said safety catch is released in the pivot connection 12, then the mirror housing 4 swings some 90° relative to the support structure 6. The said spring or spring apparatus can be a tension spring between the mirror housing 4 and the support structure 6, or a torsion spring in the area of the pivot connection 12, etc.

In accord with yet another embodiment, a motor can be placed in the area of the pivot connection 12, which, upon detection of the approach of the mirror housing 4, causes said mirror housing 4 to swing. In this case, the motor itself can form the safety catch in the pivot connection 12, that is, the motor possesses possibly a gear drive which holds the mirror housing 4 fast in the operational position when the motor is idle. Upon the approach to an obstruction, the motor is activated and then moves the mirror housing 4 relative to the support structure 6.

If a motor is employed in the pivot connection 12, then in accord with another embodiment, after passing the obstruction, the mirror housing 4 once again is run back into its starting or operational position.

The movement of the mirror housing 4 by means of a motor placed in the pivot connection 12 is further advantageous in its being subject to being switched off, so that up[on maneuvering the vehicle in close quarters, where the mirror housing 4 approaches rigid objects, obstructions, such as, for instance, building walls or the like, this switch-off prevents the mirror housing 4 from being undesirably folded back by the motor.

In addition, the sensitivity of the sensor 14, that is, the reaction threshold thereof, is adjustable.

The object of the present invention enables protecting the mirror housing 4 and in particular, the mirror pane 10 from the striking or impact forces which always arise when, at a substantial speed, the mirror housing 4 contacts an immovable obstruction and, in the pivot connection 12, the safety catch resistance to position change must be over come. As described, an embodiment can have a spring supported motion of the mirror housing 4 relative to the support structure 6. Alternately, the motorized movement can act upon mirror housing 4 in relation to the support structure 6. Consequently, the striking or impact forces cannot act upon the mirror housing 4, since, at the critical time before passing the obstruction generating said forces, the mirror housing 4 is moved out of its operation position into the folded position.

A rearview mirror has been described, in particular, a rearview mirror for motorized vehicles, wherein a pivot connection has been inserted between a mirror housing 4 in which a mirror pane 10 has been placed and a support structure 6 which holds the mirror housing on the part 8 of the body of the vehicle. Further in this respect, this pivot connection possesses at least one safety catch position. The safety catch between the mirror housing and the support structure is, in this case, releasable upon the approach of the mirror housing to an obstruction. The mirror housing can be, therefor, passively and practically force-free moved out of said safety catch position by contact with the obstruction itself. Again, it can be moved out of its operational position by a spring insert or by a motor. This movement is possible because at the approach of the mirror housing to the obstruction, the safety catch between the mirror housing and the support structure has been released.

Because of this release, the movement of the mirror housing into its folded position no longer must overcome the retentive force of the safety catch between the mirror housing and the support structure. In this way, the mirror housing is essentially free of resistance and thus moves into its folded condition without damage.

What is claimed is:

1. A rearview mirror for motor vehicles comprising:
   a mirror housing;
   a mirror pane mounted in the housing;
   a support structure for attaching the mirror housing to the vehicle;
   a pivoting connection disposed between the mirror housing and the support structure, the pivoting connection including at least one safety catch which retains the mirror housing in an operating position relative to the support structure, the safety catch being releasable upon the approach of the mirror housing to an obstruction to thereby allow the mirror housing to pivot relative to the support structure.

2. A rearview mirror in accord with claim 1, further including at least one sensor for detecting the approach of the mirror housing to the obstruction.

3. A rearview mirror in accord with claim 2, wherein the sensor is mounted in the mirror housing and monitors a fan shaped area in front of and beside the vehicle.

4. A rearview mirror in accord with claim 2, wherein the sensor is an ultrasonic sensor.

5. A rearview mirror in accord with claim 2, wherein the sensor is an infrared sensor.

6. A rearview mirror in accord with claim 2, wherein the sensor is a radar sensor.

7. A rearview mirror in accord with claim 2, wherein at least one of the sensitivity and the detection range of the sensor is adjustable.

8. A rearview mirror in accord with claim 1, wherein the safety catch is held by an electromagnetic device which is releasable upon approach to an obstruction by the disconnect of the magnetic excitement.

9. A rearview mirror in accord with claim 1, wherein the safety catch is held by a magnetic device which is releasable upon approach to an obstruction by the imposition of a counter magnetic field.

10. A rearview mirror in accord with claim 1, wherein the safety catch is held by a mechanically device which is releasable, and upon approach to an obstruction by unlocking.

11. A rearview mirror in accord with claim 1, wherein after the release of the safety catch, the mirror housing is moved into a folded position by spring force.

12. A rearview mirror in accord with claim 1, wherein after the release of the safety catch, the mirror housing is moved into a folded position by a motor.

13. A rearview mirror in accord with claim 12, wherein after passing the obstruction, the mirror housing is moved back into its operational position by the motor.

14. A rearview mirror in accord with claim 1, wherein the release of the safety catch is overridable.

* * * * *